US006339585B1

United States Patent
Hulyalkar et al.

(10) Patent No.: US 6,339,585 B1
(45) Date of Patent: Jan. 15, 2002

(54) ERROR-RECOVERY MECHANISM USING A TEMPORARY FORWARDER IN A WIRELESS-ATM NETWORK

(75) Inventors: Samir N. Hulyalkar, Bensalem, PA (US); Chiu Y. Ngo, Ossining; Dinesh C. Verma, Millwood, both of NY (US)

(73) Assignee: Philips Electronics North America Corp., New York, NY (US)

( * ) Notice: Subject to any disclaimer, the term of this patent is extended or adjusted under 35 U.S.C. 154(b) by 0 days.

(21) Appl. No.: 09/073,095

(22) Filed: May 5, 1998

(51) Int. Cl.[7] .............................................. G01R 31/08
(52) U.S. Cl. ........................ 370/226; 370/315; 370/350
(58) Field of Search ................................. 370/328–331, 370/338, 396–397, 399–400, 216–221, 225–227, 242, 345, 350, 498, 503, 321, 324, 315

(56) References Cited

U.S. PATENT DOCUMENTS

| | | | | | |
|---|---|---|---|---|---|
| 4,509,199 | A | * | 4/1985 | Ichihara | 455/7 |
| 4,961,180 | A | * | 10/1990 | Schwarz et al. | 370/227 |
| 5,109,528 | A | | 4/1992 | Uddenfeldt | 455/33.2 |
| 5,822,309 | A | * | 10/1998 | Ayanoglu et al. | 370/315 |
| 5,943,326 | A | * | 8/1999 | Schroderus | 370/324 |
| 5,953,331 | A | * | 9/1999 | Duncan et al. | 370/352 |
| 5,974,036 | A | * | 10/1999 | Acharya et al. | 370/331 |
| 6,023,461 | A | * | 2/2000 | Raychaudhuri et al. | 370/331 |
| 6,138,012 | A | * | 10/2000 | Krutz et al. | 455/427 |

FOREIGN PATENT DOCUMENTS

EP 0695102 A2 1/1996 ............ H04Q/7/32

* cited by examiner

*Primary Examiner*—Wellington Chin
*Assistant Examiner*—Kevin C. Harper
(74) *Attorney, Agent, or Firm*—Daniel J. Piotrowski

(57) ABSTRACT

A method of transmitting information in a communications system. The method preferably includes the steps of establishing a communications link between a base station and a temporary node, attempting to maintain a second communication link between the base station and a wireless terminal and upon a determination that the second link cannot be established or satisfactorily maintained, transmitting information from the first base station to the temporary node so that the temporary node can retransmit the information to the wireless terminal, attempting to reestablish the second link and upon such establishment, discontinuing the transmission of subsequent information from the base station to the temporary node and directly transmitting the subsequent information to the wireless terminal from the base station. A system to carry out the foregoing steps is also provided.

9 Claims, 10 Drawing Sheets

ERROR-RECOVERY MECHANISM USING A TEMPORARY FORWARDER IN A WIRELESS-ATM NETWORK

BACKGROUND OF THE INVENTION

The present invention relates generally to error recovery methodology in communication systems, and, in particular, to a method of error-recovery which utilizes the establishment of a temporary forwarding node through which information can be advantageously forwarded during periods when the communication link between a primary station and a wireless terminal is disabled or less than satisfactory. The establishment of the temporary forwarded node ensures that the wireless terminal and/or primary base station continuously receives the transmitted information transmitted by the other source. The present invention relates to the method of use of the temporary forwarding node in both a centralized architecture and an adhoc architecture as well as the system configurations contemplated thereby.

The success of various telecommunication systems, such as GSM, establish wireless communications as indispensable in modern life. While certain systems are directed only to voice communications, the future communications content is multimedia in nature. ATM (asynchronous transfer mode) technology has been developed over wired networks to deal with high-speed data with, for example, different data rates, different quality-of-service (Qos) requirements (such as data reliability and delay considerations) and different connection or connectionless paradigms for multimedia communications. An effective combination of wireless and ATM-based service at the consumer end of a wired network will be instrumental in establishing a large multimedia home and business communications market.

Existing efforts towards building a wireless local-area network (LAN) are focused around emerging standards, such as IEEE 802.11 (United States) and HIPERLAN (Europe). While the standards are almost mature, their development do not adequately take into consideration ATM-based service requirements of QoS guarantees for both real-time and data traffic. Essentially these requirements are the result of complex video, audio, and data service multiplexing in the same medium. For example, while audio data does not require the packet-error reliability required of data services, audio data cannot tolerate excessive delay. On the other hand, video data can in general suffer more delay than audio, although, it is less tolerant to delay jitter. These delay and packet-error rate considerations forced ATM to adopt a connection-oriented service. It also forced error-control to be performed end-to-end, instead of between every two nodes within the specified connection (error-control being understood to mean a method of ensuring reliable transmission of packets to and from a node). Such a strategy was feasible with the wired fiber-optic networks, which has a very small packet error rate. Unfortunately, wireless networks do not in general provide such low-error rates.

Delay considerations are also important for ATM service. A wired ATM network will simply block any services for which it cannot guarantee the required QoS. Typically wireless networks do not allow such a feature and the delay actually can increase exponentially in an overloaded network.

Accordingly, an improved communication system which overcomes the aforementioned deficiencies, and in particular, reduces the packet-error rate, reduces the transmission delay, and at the same time increases the quality of service guarantees, improves reliability in communication and improves error-recovery, is desired.

SUMMARY OF THE INVENTION

Generally speaking, in accordance with the invention, forward-error-correction (FEC) techniques can be used to determine drastic falls in performance if the total signal power at a wireless terminal is less than a predetermined value. This can then allow for the channel to be considered to be in either "good" or "bad" states. Of course, since the channel does not change very fast, it is expected that whenever there is a transition between the "good" and the "bad" states, it will remain in either state for considerable amount of time relative to the transmission rate of the system. If the channel goes in the "bad" state, the preferable solution is to change the channel. Utilizing this approach, the present invention contemplates the utilization of a temporary forwarding node to reroute the information from a sender to the receiver.

Specifically, a method of transmitting information in a communications system is provided. The method preferably comprises the steps of establishing a first communications link between a first base station and a second base station, attempting to establish or satisfactorily maintain a second communication link between the first base station and the wireless terminal and upon a determination that the second communication link cannot be established or satisfactorily maintained, transmitting information from the first base station to the second base station for retransmission of the information to the wireless terminal, attempting to reestablish the second communication link between the first base station and the wireless terminal and upon such establishment, discontinuing the transmission of subsequent information from the first base station to the second base station and directly transmitting the subsequent information to the wireless terminal from the first base station.

In another preferred embodiment, the method of transmitting information in a communications system comprises the steps of establishing a first communications link between a first node and a second node, establishing a second communications link between the first node and the wireless terminal, transmitting information from the wireless terminal to both the first and second nodes, the information being received by both the first and second nodes, transmitting the information from the second node to the first node, processing, in the first node, the information first received by the wireless terminal or the second node and discarding the second receipt of the information from the other of the wireless terminal or the second node.

The method of transmitting information in a communications system may also comprise the steps of establishing a communications link between a primary node and a secondary node, determining that a communications link between the primary node and the wireless terminal is unsatisfactory for reliable information transmission, transmitting information from the primary node to the secondary node for retransmission to the wireless terminal, transmitting information from the wireless terminal to the secondary node for retransmission to the primary node during which the primary node is attempting to establish a communications link with the wireless terminal, achieving establishment of the communications link between the primary node and the wireless terminal, and disabling the communications link between the secondary node and the wireless terminal.

Additionally, the present invention is directed to a communication system that can carry out the foregoing methods.

Accordingly, it is an object of the present invention to provide an improved method to more reliably relay data and/or signaling information.

Another object of the present invention is to provide a method of improving reliable data or signaling information transmission using a temporary forwarding node which may advantageously be another base station operating on preferably the same frequency, or could be another wireless terminal.

Yet another object of the present invention is to provide a method of improved reliable communication with the automatic detection of a faulty communication link with a wireless terminal.

Still another object of the present invention is to provide a method of improving reliable communication which can utilize multiple temporary forwarding nodes.

And still yet another object of the present invention is to provide a method of improving reliable data communication that can also be realized in a stationary environment such as in a residential or office building environment.

And still yet another object of the present invention is to provide a method of improving reliable data communication which can automatically terminate the link with the temporary forwarding node when the link with the primary node is satisfactorily operational.

And yet another object of the present invention is to provide a method of improving reliable communication which can be utilized in both base-station and adhoc configured networks.

Still other objects and advantages of the invention will in part be obvious and will in part be apparent from the specification.

The invention accordingly comprises the several steps and the relation of one or more of such steps with respect to each of the others thereof, and the apparatus embodying features of construction which are adapted to effect such steps, all of which will be exemplified in the following disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

For the convenience of the reader, reference is first made to FIGS. 1A, 1B, 2A, 2B, 3 and 4. FIGS. 1A, 1B, 2A and 2B illustrate various network architectures for which the present invention is applicable, while FIGS. 3 and 4 describe examples of the layered architecture of a typical wireless terminal ("WT"), base-station ("BS") and central controller ("CC"). The modifications thereof so as to be applicable by the present invention are discussed below.

Figure 1A:
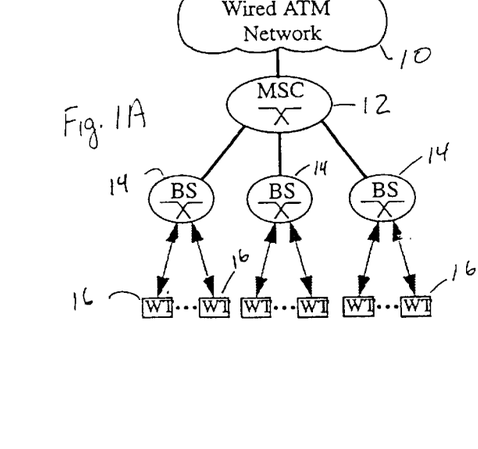
FIGS. 1A and 1B are examples of a tree topology and a ring topology network, respectively, in a BS-oriented architecture.
Figure 1B:
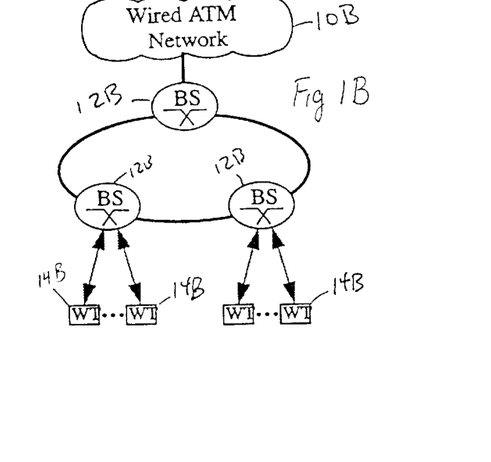
Figure 2A:
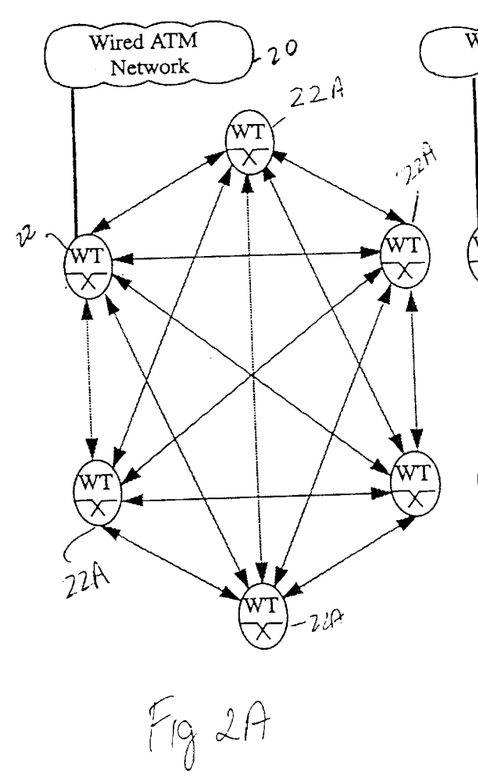
FIGS. 2A and 2B are examples of a fully connected topology and a forwarding node topology network, respectively, in an adhoc architecture.
Figure 2B:
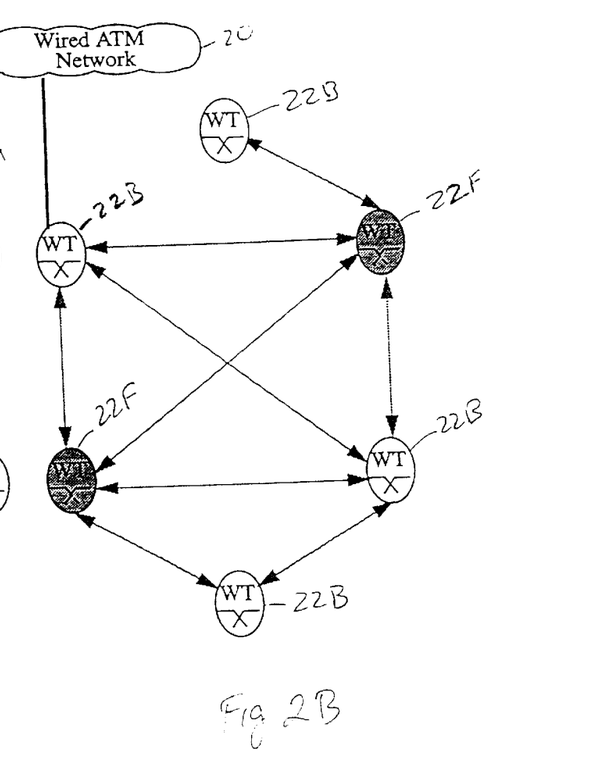

Two typical wireless networks are the BS-oriented (FIGS. 1A and 1B) and the adhoc network architecture (FIGS. 2A and 2B). In particular, FIG. 1A depicts the tree topology centralized architecture configuration, wherein the switching function is performed in a "hierarchical" way. In particular, a wired ATM network 10 is wireline connected to a mobile switching center 12, which itself is wireline connected to a plurality of base stations 14. Both the switching center 12 and each of the base stations include an ATM switch. Base stations 14 are in selective wireless connection with one or more wireless terminals 16, such as mobile units. Switching for intra-cell calls is done in base stations 14 while switching for inter-cell calls is conducted in switching center 12.

Normally, the switch in switching center 12 is more sophisticated and complex than those in base stations 14. Service areas are divided into small regions, called "cells," each of which may be served by a base station. Communications between wireless terminals are done via the base station and/or the mobile switching center.

On the other hand, in the tree topology (note that a wired ATM network 10B is wireline connected to a plurality of base stations 12B, which themselves are wireline connected to each other in a ring fashion and wherein each base station 12B may be wirelessly connected to one or more wireless terminals 14B. Here, only the base stations include ATM switches.), centralized architecture configuration depicted in FIG. 1B, the switching function is performed in a "distributed" way. While switching for intra-cell calls is done in the BS in the tree topology, switching for inter-cell calls is conducted by passing the call to the destined BS switch around the ring. Unlike the tree topology, the ring topology uses identical BSs and switches which makes it much easier to be scaleable.

Reference is now made to FIGS. 2A and 2B, which illustrate distributed architecture networks, which, in contrast to the centralized architecture, do not require any base station. In a distributed architecture configuration, each of the wireless terminals have the capability to perform switching as well as communicate directly with other WTs. All these WTs together form an adhoc network as described in HIPERLAN and IEEE 802.11. In an adhoc network, there are, essentially, two types of topologies. FIG. 2A depicts the fully-connected topology wherein a wired ATM network 20 is wireline connected to at least one wireless terminal 22, which itself is connected to each of the other wireless terminal 22A in the network and each of the wireless terminals 22 and 22A include a ATM switch. Specifically, in the fully-connected topology (FCT), all wireless terminals are assumed to be able to communicate with each other and sufficient power is assumed to be used by all wireless terminals such that each wireless terminal can maintain a link with every other wireless terminal. On the other hand, in the forwarding-node topology, not all wireless terminals can talk to each other. As shown in FIG. 2B, certain wireless terminals are designated forwarding nodes (22F), details of which will be discussed below. The remainder of the wireless terminals 22B are wirelessly connected to selective other wireless terminals. All the wireless terminals include an ATM switch and the wired ATM network is configured similarly to FIG. 2A. In a FNT, a region, such as a home, is then partitioned into partially-connected "cells."

Both the control or the data channels can be implemented in either a centralized or a distributed mode. For the control channel, when it is implemented in a centralized mode, all control messages from WTs must be sent to a designated central controller where control actions are determined and transmitted back to a user. When it is implemented in a distributed mode, no central controller is used and all the control functions are distributed among WTs. In this case, it is important to maintain a consistent control database among all users. For the data channel, when it is implemented in a centralized mode, transmission of packets between two users must be done through a designated central node. However, for a distributed data channel, no central node is assigned and transmission of packets between two users can be done directly. Therefore, it is not necessary to transmit the packets from the transmitter to a central node and then from the central node back to the receiver, thereby avoiding wasting valuable wireless system bandwidth.

Reference will now briefly be made to the MAC protocol in connection with the layered architecture in the base station and the wireless terminal operating thereunder.

In U.S. application Ser. No. 08/656,803, which is herein incorporated by reference, a reservation-based MAC protocol is described, which allocates bandwidth as a two step process. In the first step, bandwidth allocation is done over the call duration and in the second step, bandwidth allocation is arbitrated over a frame duration. The latter frame duration is termed a control-data frame (CDF), and is typically of much smaller duration than the duration of a call. Such a process allows calls to be blocked if the network is overloaded, and hence forces an upper bound on the maximum delay possible within such a network. This allows for QoS expectations of delay to be adequately addressed by a WATM network.

Unfortunately, it does not adequately address the variability of the wireless channel in terms of the packet-error loss rates. At this point it is useful to consider the characteristics of the wireless channel. For residential and office communications, generally most of the wireless terminals (WT) are stationary for the duration of a call, i.e., it is not expected to support mobile terminals during the duration of a call. Hence in this situation the channel change is slow and is only due to movement of other objects. In existing standards and literature, most solutions for ensuring reliability have assumed that a mobile terminal is used.

In general for a mobile terminal, the channel changes quite rapidly because the channel characteristics can change quite drastically even between two very close locations (because of the multipath nature of transmission which can add or subtract depending on the phases of transmission paths which vary enormously for small distances when a high-frequency signal (upwards of 5 GHz) is sent). In fact for a mobile terminal, the channel change can be so fast, that a signal is assumed to "fade" randomly from time to time. In such a scenario, a high packet-error rate can be expected—perhaps of the order of 1e–3. In this case, to ensure reliability, a packet retransmission approach is used, i.e., there are means of detecting a packet error at the receiver, and if a packet error is detected, the receiver asks the sender to send the packet again.

For a wireless terminal, when the channel is essentially stationary, i.e., the channel changes are slow, a different scenario is expected. In this case, there will be times when the signal goes into a "deep" fade because of temporary blocking of the transmission path of the signal, which, since the channel change is very slow, will remain in effect for a large amount of time. Thus, much larger bursts of errors are expected as compared to a mobile terminal, although the "good" time will also be correspondingly higher.

Reservation-based MAC protocols must be considered for the BS-oriented and the adhoc architectures. Specifically, in the BS-oriented network, both control and data channels are implemented in the centralized mode. And in the adhoc network, the control channel could be implemented in either the distributed or the centralized mode and the data channel is assumed to be in the distributed mode. A centralized control channel in a distributed network architecture is justified based on significant simplification of the MAC layer protocols, which may then be incorporated within every device with a method of choosing a "current" central controller. Thus in both the BS-oriented and adhoc networks, a centralized control strategy is preferable.

As will be discussed below, the present invention preferably includes a centralized controller to arbitrate access among different WTs. The centralized controller provides information to the end users as to which user is supposed to transmit at a specific time.

Figure 3:
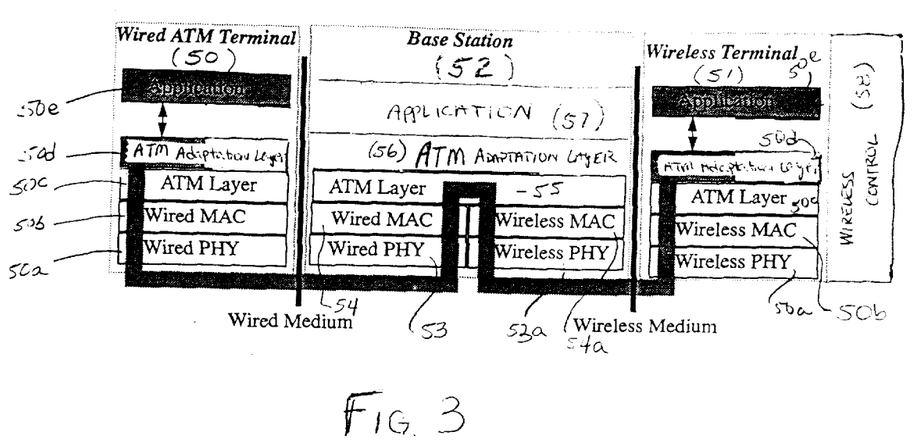
FIG. 3 is a wireless ATM layered model for a BS-oriented network.

Reference is now made to FIG. 3 which depicts a layered model for a wired/wireless-ATM system for a BS-oriented network. As depicted, the model includes at least a wired terminal 50, a wireless terminal 51 and a base station 52. The temporary forwarding node is preferably another base station configured similarly to base station 52. Both the wired terminal 50 and the wireless terminal 51 each respectively include a physical layer 50$a$, 51$a$ for frequency control and modem communication (or the like), a medium access control (MAC) layer 50$b$, 51$b$, an ATM layer 50$c$, 51$c$ for various multiplexing and connection processes, an ATM adaptation layer 50$d$, 51$d$ for data sequencing information into smaller packets, and an applications layer 50$e$, 51$e$ for other types of data transfer. Base station 52 has similar layers to those of terminals 50, 51 and in particular, respective wired and wireless physical layers 53, 53$a$, a wired and wireless MAC layer 54, 54$a$, an ATM layer 55, an ATM adaptation layer 56 and an applications layer 57.

At the BS, ATM switching is performed and resource and mobility management are handled. Using separate wired and wireless MAC and physical layers the base station 52 can handle both wired and wireless-ATM traffic as shown by the illustrated application path between terminal 50 and wireless ATM terminal 51 The communications system will also include a wireless control 58 which will control the ATM layers, the MAC layers and the physical layers. Wireless control 58 controls the establishment of the links between the BS and the wireless terminals and the temporary forwarding node, maintains the links as discussed below, controls the transmission of information among the base station, temporary forwarding node and the wireless terminals, and reestablishes control and terminates control among the nodes in the system. A layered model for each of the WTs in an adhoc architecture is not depicted, but would be well understood by one of ordinary skill in the art, wherein there is no base station but in its place, a central controller.

In the wireless ATM system, the unit of information transfer is the ATM cell. If the ATM cell is incorrectly received, then it must be discarded. Hence, in this case, powerful Reed-Solomon ("RS") codes may be used with strong error-correction capacities. For example, an RS (63, 53) could be used which can correct up to five byte errors within its 63-byte packet (the information bytes and the added parity-check bytes). The number of extra parity bytes added to every packet decide the error-correction capabilities of the RS code.

Figure 4:
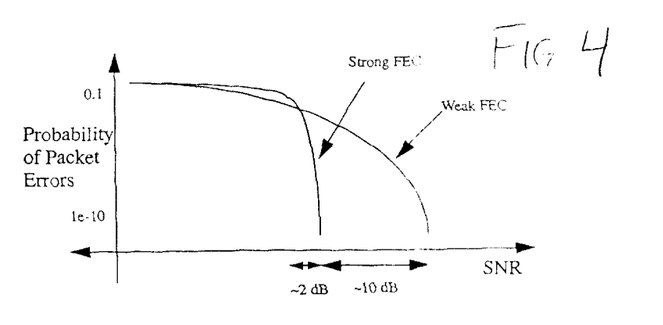
FIG. 4 is a graph illustrating a typical relationship between packet-error probability and signal-to-noise ratio for both a weak and a strong forward-error-correction coded system.

Reference is now made to FIG. 4 which depicts, qualitatively, the difference between the design of a strong and a weak Forward-Error-Correction (hereinafter "FEC") coded system. Note that a strong FEC-coded system forces the "waterfall" curve between the probability of packet errors and signal-to-noise-ratio (SNR) to be extremely steep. Essentially, then a specific receiver can go from a "good" channel state to a "bad" channel state with a very small change in SNR. Typically, the indoor channel changes slowly with time (as compared to the data-rate of transmission—about 20 Mbps). For example, in residential buildings or office environments a channel can be expected to be stationary for a few seconds, and prior work in the art has reported changes in the office environment at the maximum rate of 6.1 Hz, although measurements were made using only a single frequency. Hence, for the purposes of the MAC protocol, it is a reasonable assumption that the link quality can be in one of two conditions, a "good" channel and a "bad" channel, i.e., when errors occur, they always occur in bursts.

As briefly alluded to above, the present invention is well integrated in a MAC protocol base system, but it will be readily understood by one of ordinary sill in the art that the present invention is not limited to the MAC protocol.

The MAC layer divides all messages it sends into two parts—control/signaling and data messages. The signaling messages are used to perform the MAC level function of ensuring access to a channel. Essentially, any signaling or data packets are viewed as occupying time slots. Each ATM packet (53 bytes+MAC header+physical layer header) is assumed to occupy one time slot.

All data transmission is preferably done within a time-division-multiple-access (TDMA) frame. One TDMA frame describes a certain number of slots, which can be fixed or variable.

Figure 5:
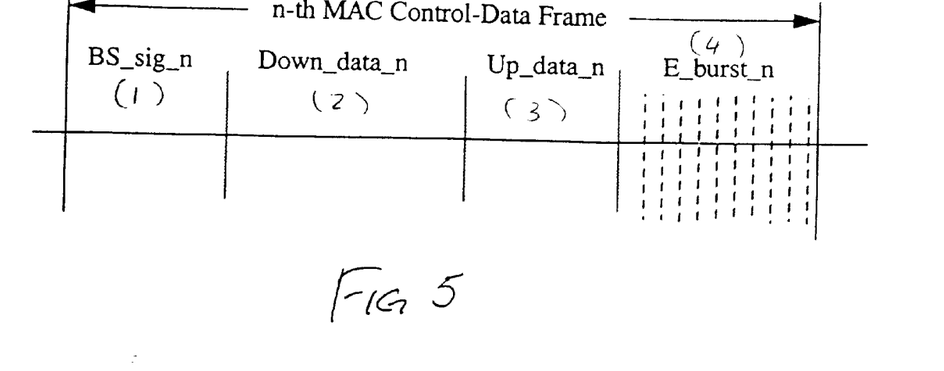
FIG. 5 illustrates a control-data-frame for a base-station oriented architecture.

Reference is now made to FIG. 5, which depicts a TDMA frame, which for convenience, may also be referred herein as a control-data-frame (CDF), and applicable in the BS-oriented network architecture for WATM. Such a network is described in U.S. application Ser. No. 08/770,024, which is incorporated herein by reference.

In each MAC control-data frame, there are four phases, namely, (1) BS__sig, (2) Down__data, (3) Up__data, and (4) E__burst. During the BS__sig phase, the BS transmits all of its signaling information to the WTs. Following its signaling phase, the BS sends the down__link data in the down__data phase. Next, the WTs transmit information in a pre-specified order (which may be specified within the BS__sig phase) in the Up__data phase, which includes piggybacked signaling information. The piggybacked signaling information typically contains a slot allocation request from the BS in the next CDF phase. During the E__burst phase, all WTs who did not send any data in the previous CDF, and were assigned specific E__burst slots, will transmit at their specific E__burst slot an energy signal. This energy signal will indicate to the BS that a particular WT within that E__burst slot requires bandwidth to be allocated for transmission.

Figure 6:
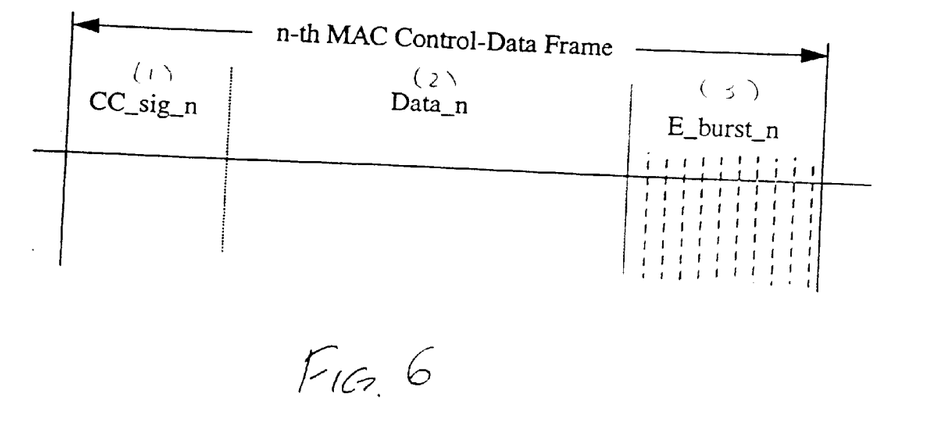
FIG. 6 illustrates a control-data-frame for an adhoc architecture.

Reference is also briefly made to FIG. 6, which illustrates a CDF in accordance with the MAC protocol for an adhoc network, the similarities and differences to the BS Oriented Architecture again being well understood by one of ordinary skill in the art. In the adhoc network configuration, there are only three phases (1) CC__sig, (2) Data__n and (3) E__burst. A central controller is first elected and it will be understood that a difference between the CDF for BS-oriented architecture and the CDF for adhoc architecture is that there is no explicit Up__data or Down__data phase for the CC. In an adhoc network, there is still the requirement of a central controller to control the signaling/control information and available slot allocation, and it is the data information between the WT and the CC that is distributed such that each WT, during its slot, "piggybacks" its control information to the CC, where (among other control messages) it specifies the number of slots requested for the next CDF. The CC collects all the information and allocates slots to the requesting WTs depending on many parameters, some of which are discussed in the aforementioned U.S. application Ser. No. 08/656,803. In an adhoc network, the CC during the CC__sig phase specifies the allocation of the slots to the transmitting WT.

Figure 7:
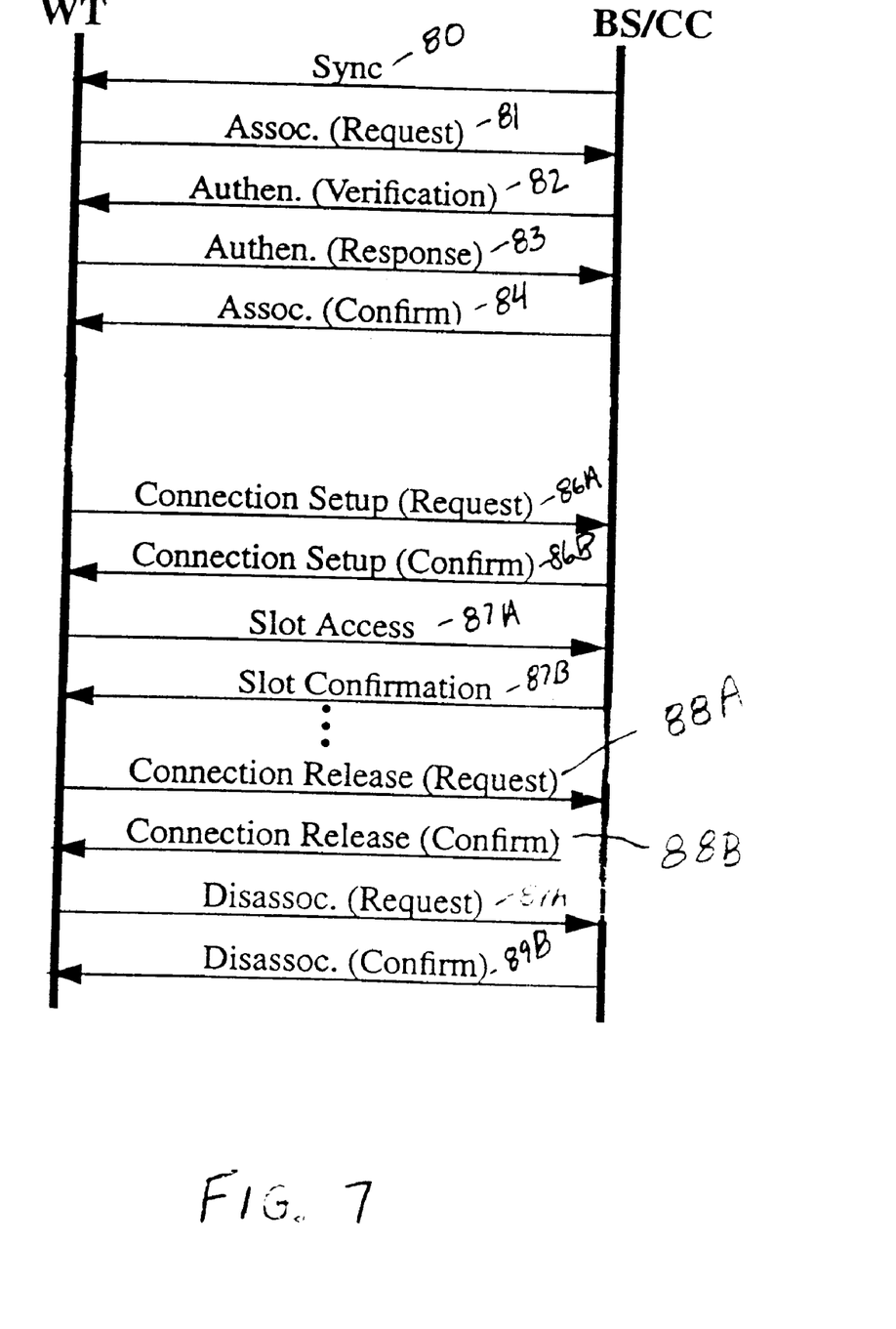
FIG. 7 illustrates the methodology of the start-up mode and connection set-up functions in a wireless terminal.

The foregoing description was provided with respect to the "steady-state" operation of a TDMA frame. FIG. 7, in connection with the following text, describes the mechanism of how a WT turns ON and accesses the network. Specifically, FIG. 7 illustrates the sequence of functions that a WT goes through to obtain a connection for one of the ATM-based services. The first function for the WT is to synchronize itself to the TDMA frame (step 80). To enable this synchronization, the BS periodically sends timing information, which allows the WT to synchronize.

After synchronization, the WT must "associate" with the network for which it needs an assigned slot. The mechanism to obtain a slot is to send a request (step 81) for a slot during the E__burst phase. Since the BS/CC is not yet aware of the existence of the WT, the BS/CC assigns periodically a certain number of E__burst slots to no particular WT, and here the WT randomly selects one of these unassigned slots to ask for the request of a slot in a succeeding CDF. The BS/CC then assigns a slot indicating the slot number in which it receives an E-burst. If two WTs simultaneously asked for a slot in the same E-burst, then there will be a collision. Then the WT must use any of the random access resolution strategies to resolve this collision. Thus a WT can get a slot assigned to itself for association. Such a method of getting a slot assigned is known as Scheduled Contention.

After the WT has successfully sent its association information, the BS/CC may request authentication from the WT (step 82) to ensure that the user is authorized to enter the wireless network. The WT sends an authentication response (step 83), and if the information is as expected, then the WT is allowed to associate within the network. The BS/CC then sends an association confirm message (step 84) to the WT and also informs other WTs about the existence of the new WT via its BS_sig/CC_sig phase.

After the WT has successfully associated in the network, it must still go through a connection setup phase (step 86A, B) to inform the BS/CC that it has data to send. For every connection, it requests (step 86A) a slot via the E_burst and sends the connection-related information, such as the data-rate of interest and the QoS constraints related to the connection. The BS/CC using a Call Admission Control (CAC) mechanism determines whether it can support such a connection (step 86B).

Once a WT is guaranteed enough resources for the duration of the connection (which typically will comprise of many TDMA frames) via the connection-setup confirm message from the BS, it must still send a current slot allocation request every CDF (87A). This allows the BS/CC to cater to instantaneous demands of many WTs and allows for a certain amount of statistical multiplexing, instead of a fixed TDMA assignment per CDF. This allocation request for the next CDF is sent via piggybacking on existing data slots in the current CDF (during the UP_data phase in the BS-oriented network, and during the DATA phase in the adhoc network as described earlier). If a WT did not have a slot allocation in the current CDF, then it requests a slot in the next CDF via the E-burst phase. The BS receives all the slot requests (via piggybacked data and E_bursts) and then allocates specific slots to the WTs during the BS_sig/CC_sig phase. The BS will also confirm the connection setup to the WT (step 87B).

Once the connection is finished, a connection release message is sent to the BS/CC (88A). This message releases the resources that the BS/CC had reserved. The BS will confirm this connection release (step 88B). Finally when the WT decides that it must switch OFF, then it sends a disassociation request (step 89A) which is confirmed by the BS/CC (step 89B). It will be readily recalled that the above MAC protocol works when the channel is in a "good" state. However, when the channel goes into a "bad" state for a particular BS/CC⇋WT link, then no transmission can take place.

In order to improve the reliability of communication, the fill present invention recognizes the advantages of establishing a redundant transmission path via a Temporary Forwarder Node (hereinafter "TFN").

In the preferred embodiment, the following "parameters" are preferably integrated into any applicable network architectural scheme.

1. A TFN is used for the BS/CC⇋WT link only when the WT is already registered into the network, i.e., the TFN does not service unregistered WTs.

2. A TFN is used for the BS/CC⇋WT link only when the WT is already assigned nominal bandwidth for its connections, i.e., the TFN does not implement CAC for the WT, although this parameter simplifies the implementation of the TFN but is not necessarily required.

3. The WT may or may not receive BS_sig/CC_sig during the temporary downtime.

4. The BS/CC can detect E-burst but not data from the WT during downtime.

5. The TFN can transmit/receive from either the BS/CC or the WT.

6. The TFN must be assigned before the unexpected downtime occurs.

Reference will now be made to the implementation of a Temporary forwarder node in a BS-oriented network. In such a network, while it would be understood that the temporary forwarder node could either be another WT or could be a secondary BS, the preferred embodiment contemplates another BS as the TFN, since there exists a wired connection between the secondary BS and the primary BS, which would provide readily identifiable advantages.

For example, utilizing a secondary BS as a TFN will provide that the data (and possibly signaling) connection between the TFN and the primary BS can use the wired link. This reduces the "stress" on the wireless link budget.

Generally speaking, when a packet is transmitted from a wireless unit to a primary base station on a selected frequency, a secondary base station (i.e. the TFN) would also receive the transmission. The TFN would then forward the received packet to the primary base station on the wired network. The primary base station selects the first of all the packets received in this manner, and discards duplicates. That is, when the primary base station is communicating with the WT, the information being transmitted by the TEN is duplicative information. This information, upon the recognition by the primary base station that it is duplicative, is discarded.

When a packet needs to be transmitted from the base station to another wireless terminal, such as a mobile unit, the base station transmits it to the mobile unit, and may wait for an acknowledgment by the WT. After a pre-determined number of failed attempts, the primary base station may simply transmit the packet of information along the wired network to the secondary base station (TFN) which would then in turn transmit the packet to the mobile unit using the same frequency. In this manner, the base station ensures that the mobile receives the packet on the frequency that it is expecting.

Figure 8:
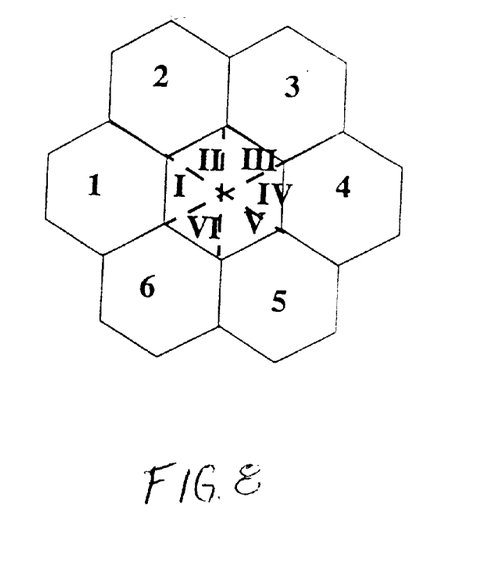
FIG. 8 depicts a cell configuration in a system that utilizes the present invention.

Reference is now made to FIG. 8, taken in connection with the following, which discloses various schemes for the selection of the TFN. It should be understood that the selection of a secondary base-station will be based on different criteria and parameters placed on the system.

That is, one selection scheme is to have each base-station (1–6) act as a secondary to all of its neighbors. Unfortunately, it will be readily apparent that such a scheme would require that each base-station (1–6) listen to six times as many wireless terminals (i.e. mobile units) as it normally would be required. The load on each base station can be reduced, however, such that a base station need listen only to twice the normal number of mobile units, if a base-station only acts as a secondary for the mobiles for which it is the second closest, wherein the TFN would be determined by the location of the mobile unit. For example, all mobiles in the figure which are in region I would use the neighboring base-station 1 as the secondary, mobile units in region II would use the neighboring base-station 2 as the secondary and so forth.

Lastly, the present invention contemplates a selection scheme whereby the TFN is determined by the movement of the ino mobile unit. That is, the TFN of each mobile unit would be determined when the mobile moves into the cell. The TFN is determined by the location of the mobile unit's previous cell, and the same secondary is kept as long as the mobile is in the cell. When the mobile leaves a cell, the currently acting base-station becomes the secondary (TFN) for the mobile unit. Thus, for example and referring again to FIG. 8, a mobile unit which enters the central cell from the neighboring cell 1 is assigned the base station of cell 1 as the (TFN) as long as it is in the central cell. When the mobile leaves the central cell, for example to cell 3, the base station in the central cell becomes the TFN for the mobile unit.

Reference is now made to FIG. 9, which again depicts a TDMA frame for a BS-oriented architecture. For ease of illustration, it is assumed that the BS and WT have determined that the link between them is down (and the WT will now be referred to as the down WT), and the TFN has been identified (as discussed above) through which data transmission will then take place. In accordance with the present invention, the method of TFN implementation in a BS-oriented network is to have a special TF_phase, which itself may be split in three parts—the (1) TFNSIG, (2) TFN_DN, and the (3) TFN_UP phases. During the TFN-SIG phase, the TFN sends signaling to both the BS and the down WT, such as copying the slot allocation assignment for the down WT from the BS_sig phase and relaying the slot allocation request from the down WT back to the BS.

Figure 9:
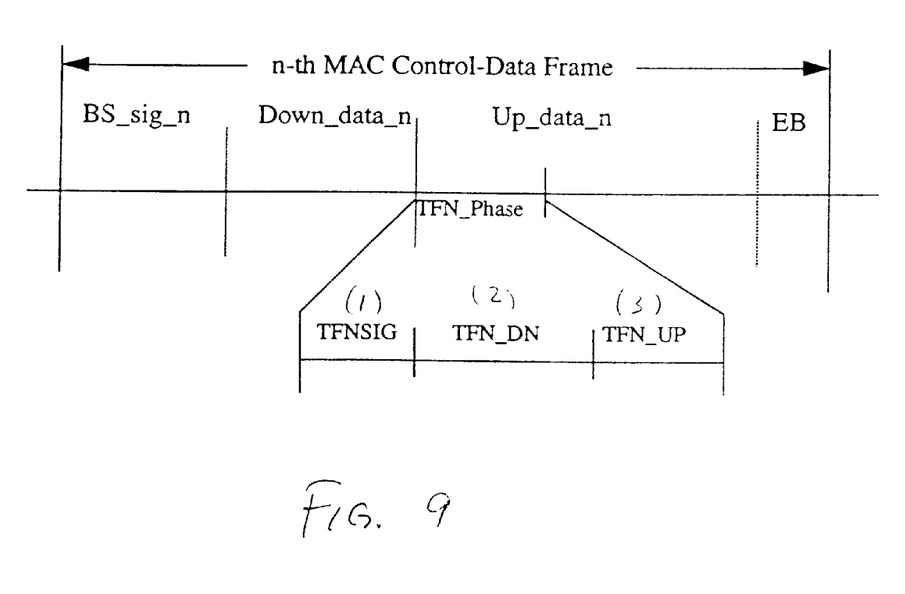
FIG. 9 illustrates a control data frame for a base-station oriented architecture including information phases of a temporary forwarding node in accordance with the present invention.
Figure 10:
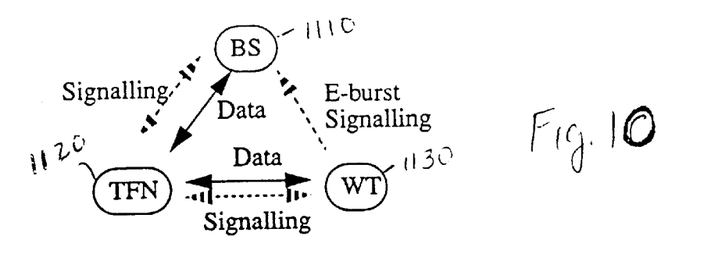
FIG. 10 is an illustration of communication link operations in a base-station oriented architecture.

The TFN_DN and the TFN_UP phases are preferably used to transfer data between the down WT and the BS. Both the down WT and BS must listen to the TFN_DN phase, while the down WT transmits data and signaling during the TFN_UP phase to the TFN. It will now be readily appreciated that if the TFN is a secondary BS, then the data transmission between TFN⇌BS can be done via a wired mechanism, as long as an appropriate "handoff" sequence from the primary BS to a secondary BS is initiated. Such handoff schemes are known in the art. Such a configuration will reduce the overhead of data transmission via the TFN.

In the preferred embodiment, the TFN will not monitor the EB (E_Burst) phase. Since the BS can monitor the EB phase, it can allocate one slot for the TFN_UP phase when it detects an EB request from the temporarily disconnected down WT. The TFN combines the allocation requests of itself as well as the down WT requests and sends the combined request to the BS. This combined request can be sent via the TFNSIG packet. Note that at the minimum one packet comprising the TFNSIG phase must always be assigned by the BS to the TFN, and the TFN should always send the TFNSIG packet regardless of whether there is a necessity of a TFN or not.

Figure 12:
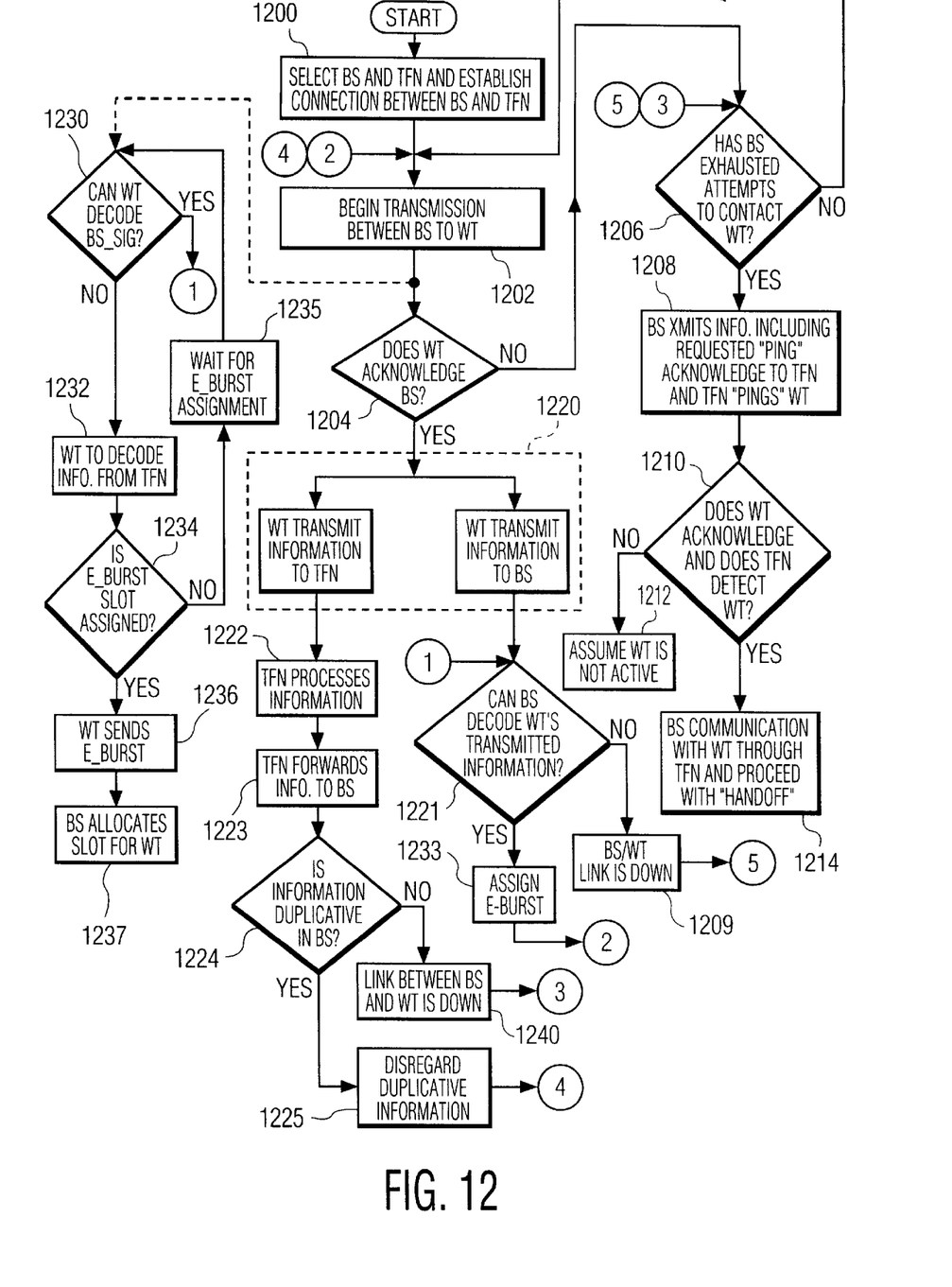
FIG. 12 is a flow chart illustrating a preferred embodiment of a method of communication in accordance with the present invention in a base-station oriented architecture.

Reference will now be made to FIG. 12 for an illustration of the preferred methodology by which the BS determines that the link between the BS and a WT is down and the implementation of the TFN. Firstly, it will be recalled that a TFN must be selected and connection between the BS and the TFN must be established (step 1200). As will also be recalled from above, the BS will begin data transmission to the WT (step 1202). Such data transmission may include a "ping" message to the WT, which would require the WT to respond (step 1204). If the WT does not respond, the BS may either immediately assume the WT is down or may repeat the acknowledgment request for a preselected number of times (step 1206). Once the preselected number of times (which may be set to one (1), by way of example) has been exhausted, the BS would then relay the "ping" message to the WT via the TFN (step 1208). If the WT responds to the TFN and the TFN does receive the acknowledgment (step 1210) it is determined that the link between the BS and WT is down and the WT will communicate with the BS through the TFN (step 1214). If the WT still does not respond and/or the TFN does not detect the WT (step 1210), then it is assumed that the WT is not active anymore (step 1212).

Alternatively, the methodology by which it is determined that there is a termination of the BS and WT link may include a query whether the BS can decode information being transmitted by the WT. For example, and referring again to FIG. 12, after the acknowledgment from the WT to the base station's transmission (step 1204), the WT will transmit information to both the BS and the selected TFN (step 1220). While the TFN is also processing the WT transmitted information (steps 1222–1223 and discussed in further detail below), there is a determination (step 1221) of whether the BS can receive and accurately decode the transmitted information. If the answer is negative, it is decided that the BS-WT link is down (step 1209) and the system proceeds to step 1206. If the BS does accurately decode the information transmitted by the WT, the E_burst signal is transmitted (step 1233) as discussed earlier, and the system proceeds to step 1202.

While the above sequence can determine whether the link between the BS and WT is down, it may be too slow for the WT. Reference is therefore also made to FIG. 12 for a WT-initiated determination of whether the link between BS and WT is operational. Specifically, if the BS⇌WT link is down, it would not be possible for the WT to decode information from the BS, such as the contents of BS_sig, resulting in that the WT does not know among other things, when the E_Burst phase starts. Accordingly in the preferred methodology, the WT performs the following: After the TFN has been selected (step 1200) and the BS has transmitted its information to the WT (step 1202), as soon as the WT determines that it is not able to decode BS_sig (step 1230), it decodes TFNSIG (step 1232), which has the timing information of all the CDF phases, and thus the WT knows the location of its E_Burst slot. It is clear that if the WT can decode BS_sig and the BS acknowledges such receipt, the transmission link between the WT and BS is established and the BS and WT communicate in a normal fashion. If the E_Burst slot for the WT has not been assigned in the current CDF (step 1234), then the WT waits until an E_Burst slot is assigned (step 1235) and step 1230 is again repeated so the WT can keep attempting to decode the BS_sig slot and maintain its synchronization via the TFNSIG slot. If the E_Burst slot was assigned, the WT sends the $E_{13}$Burst in its E_Burst slot (step 1236). Thereafter, The BS allocates the slot for the WT (step 1237). Meanwhile, it is readily recalled that since the WT cannot decode the BS_sig, the WT cannot transmit in the slot assigned by the BS and the BS may also determines that the link between the WT⇌BS is down (step 1204).

In an alternative methodology, the TFN could relay the slot allocation via TFNSIG and the WT decodes it and transmits its data. However, the BS still could not decode the packet and thus a determination by the BS that the BS⇌WT link is down could also be made.

At this point it should be recalled that the WT, whether the link between the BS and the WT is down or not, is simultaneously trying to transmit information to both the TFN and the BS (step 1220). The TFN is therefore processing this information (step 1222) and forwarding it to the BS (step 1223). If the BS is already adequately receiving the information from the WT, the TFN's information will be duplicative and discarded (steps 1224, 1225) and the process returns to step 1202. If the information is not duplicative, the link between the BS and the WT is down (step 1240) and the process returns to step 1206.

Once the BS has determined that the link between BS⇌WT is down and that the TFN has an established link with the WT (step 1214), the BS selects the TFN to initiate an "handoff" procedure. All data that would have been sent directly to WT is now directed towards the TFN. Specifically, the BS moves the WT bandwidth allocation to the TFN and also allocates extra bandwidth to the TFN to communicate with the BS and TFN. It should be understood that if the TFN is a secondary BS then the extra bandwidth allocation is minimal.

Figure 13:
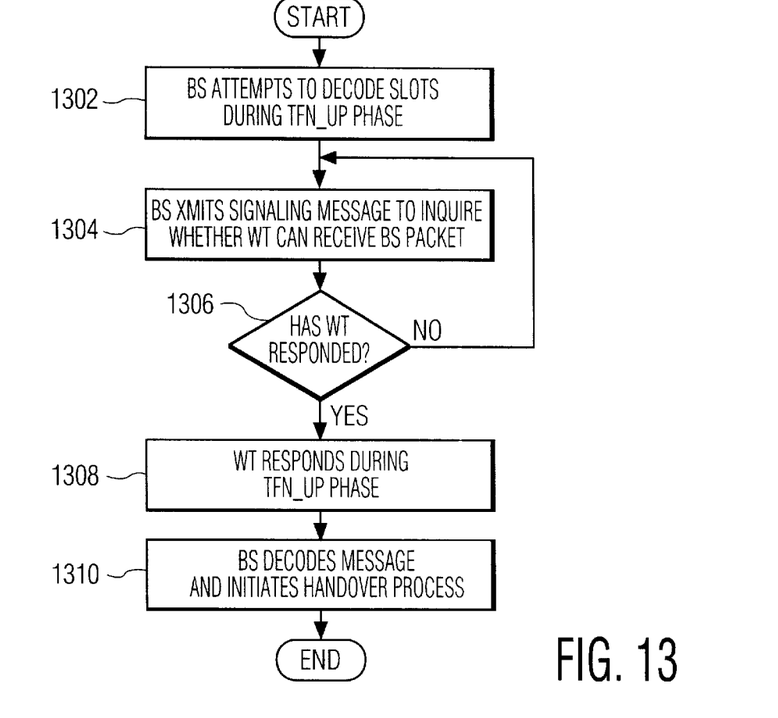
FIG. 13 is another flow chart illustrating a preferred embodiment of a method of communication in accordance with the present invention in a base-station oriented architecture.

The BS must also be able to determine when the link between the BS⇋WT is operational once again. In the preferred embodiment, the methodology is as follows, with reference being made to FIG. 13 for ease of illustration. Firstly, BS continually tries to decode the slots during the TFN_UP phase (step 1302). Nextly, BS sends a signaling message to the WT asking whether the WT can receive the BS packets (step 1304) and continues to do so until WT can respond (step 1306). Upon the ability by the WT that it can receive the BS packet, WT responds with a "yes" via its signaling path during the TFN_UP phase (step 1308). BS decodes this message, and then initiates the handover process to remove the TFN (step 1310).

Figure 11:
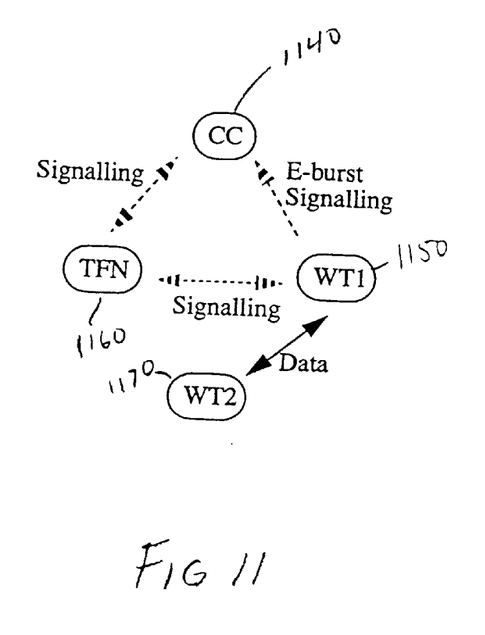
FIGS. 11 and 11A illustrate communication link operations in an adhoc network.
Figure 11A:
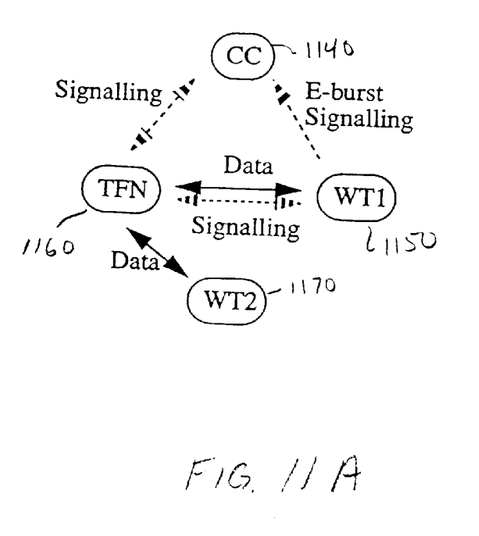

Thus it can be seen that the minimal overhead, and only extra signaling, it is possible to have a TFN in a BS-oriented network. Reference is also briefly made to FIG. 11A which summarizes the foregoing by illustrating the communication links between a BS 1110, a TFN 1120 and a WT 1130. It should also be recognized that when the TFN is not used, the extra overhead is merely the TFNSIG that is sent every CDF. For this reason, use of the secondary BS is the preferable choice for a TFN in a BS-oriented network.

Based on the foregoing, it should then be understood that it is possible to select among multiple TFNs. In this configuration, the WT, when discovering that its link with the BS is down, would preferably determine the best TFN, based for example, on the received energy level from the energized TFNs and the multiple TFN phases received by the WT and generated by each respective TFN. The BS on discovery that its link is down preferably would request all the TFNs to try to communicate with the WT. The WT then communicates its TFN selection to the TFN of choice, which in turn communicates this information back to the BS. As can be seen, many configurations are contemplated hereby resulting in still further improved reliability, with only an increase in overhead and protocol complexity being caused thereby.

Figure 14:
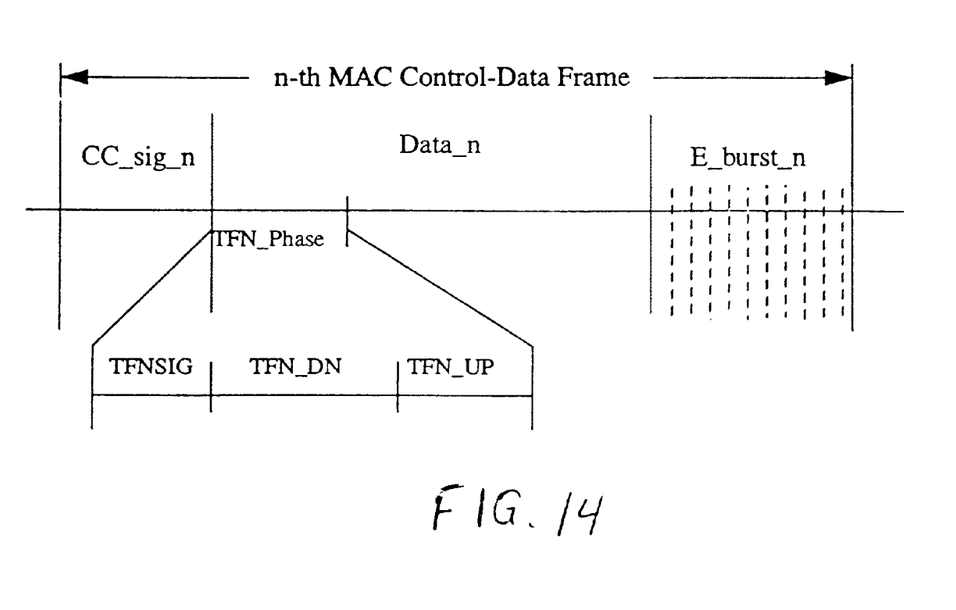
FIG. 14 illustrates a control data frame for an adhoc architecture including information phases of a temporary forwarding node in accordance with the present invention.

Reference is now made to FIG. 14 which in combination with the following, describes the use of a TFN in an adhoc network. Firstly as will be recalled from FIGS. 2A and 2B, there are no base stations, but rather only wireless terminals. Accordingly, the temporary forwarder is preferably another WT. As would also be readily recalled, there is no explicit data phase in an adhoc network. An exemplary TDMA frame in an adhoc architecture with a CC and a TFN is illustrated. As depicted, the TFN_phase is preferably initiated in the Data_n phase of the CDF. Two scenarios in an adhoc configuration are contemplated, the first depicted in FIG. 11, sets forth the scenario whereby the link between the CC (1140) and WT1 (1150) is down, signaling is taking place between the TFN (1160) and the CC (1140) and the data link between WT1 (1150) and WT2 (1170) is still active while FIG. 11A depicts the second scenario whereby both the links between WT1 (1150) and WT2 (1170) and between CC (1140) and WT1 (1150) are down.

For either scenario, however, similar to the description in the BS_sig case, the TFN can be assumed to have a TF_phase. However, for the scenario of FIG. 11, there is no necessity of having a TFN_DN and TFN_UP sections, but rather only the TFNSIG section is necessary for the relaying of the signaling information from the TFN to WT1 and also from the TFN to the CC. The TFN must monitor the signaling messages of WT1. In the preferred embodiment, the data transmission between WT1 and WT2 would proceed without any interruption. Accordingly, there would be no need to initiate a "handoff" procedure. The TFN would merely be a conduit for transferring signaling messages between the WT and the CC.

As would also be understood, by this method and similar to that described above, the WT is able to determine that the link between the CC and WT is down and can also determine when the link between the CC and WT is operational to start sending the control messages directly to the CC.

Figure 12A:
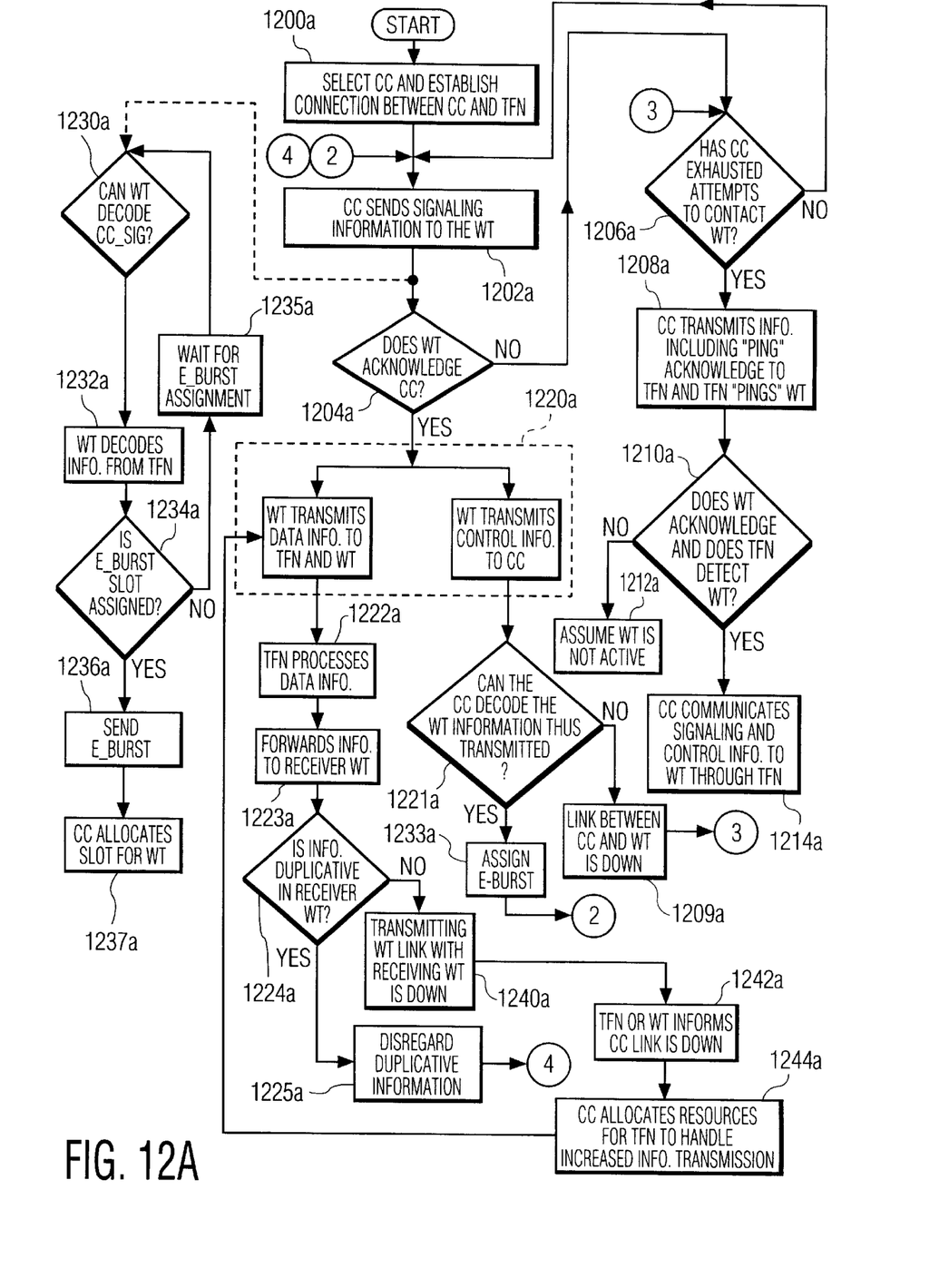
FIG. 12A is a flow chart illustrating a preferred embodiment of a method of communication in accordance with the present invention in an adhoc network.

In accordance therewith, reference will now be made to FIG. 12A for an illustration of the preferred methodology by which the adhoc network determines that the link between a transmitting the CC and the WT is down. Firstly, it will be recalled that a central controller and a TFN must be selected and connection between the CC and the TFN must be established (step 1200a). As will also be recalled from above, the CC will begin control information transmission to a WT (step 1202a). Such control information transmission may include a "ping" message to the WT, which would require the WT to respond (step 1204a). If the WT does not respond, the CC may either immediately assume the WT is down or may repeat the acknowledgment request for a preselected number of times (step 1206a). Once the preselected number of times (which may be set to one (1), by way of example) has been exhausted, the CC would then relay signaling/control information such as the "ping" message to the WT via the TFN (step 1208a). If the WT responds to the TFN and the TFN does receive the acknowledgment (step 1210a) it is determined that the link between the CC and WT is down and the WT will communicate regarding control and signaling information with the CC through the TFN (step 1214a). If the WT still does not respond and/or the TFN does not detect the WT (step 1210a), then it is assumed that the WT is not active anymore (step 1212a).

Alternatively, as with the base station oriented network, the methodology by which it is determined that there is a termination of the CC and WT link may include a query whether the CC can decode the control information being transmitted by the WT. For example, after the acknowledgment from the WT to the central controller's transmission (step 1204a), the WT will transmit control information to the CC and will transmit data information to the selected TFN and the receiving WT (step 1220a). While the TFN is also processing the transmitting WT's transmitted information (steps 1222–1223), there is a determination (step 1221a)of whether the CC can receive and accurately decode the transmitted control information. If the answer is negative, it is decided that the link between the CC and the transmitting WT is down (step 1209a), in which case the CC tries to contact the transmitting WT (1206a). If the CC does accurately decode the information transmitted by the transmitting WT, the E_burst signal is assigned (1233a)and the process returns to step 1202a.

Similar to the base-station configuration, if the link between the CC and the transmitting WT is down, it would not possible for the WT to decode control information from the CC, such as the contents of CC_sig, resulting in that the WT does not know among other things, when the $E_{13}$Burst phase starts. Accordingly in the preferred methodology, the WT performs the following: After the TFN has been selected (step 1200a)and the CC has transmitted its control information to the WT (step 1202a), as soon as the WT determines that it is not able to decode CC_sig (step 1230*a*), it decodes TFNSIG (step 1232*a*), which has the timing information of all the CDF phases, and thus the WT knows the location of its E_Burst slot. It is clear that if the WT can decode CC_sig and the CC acknowledges such receipt, the transmission link between the WT and CC is established and the CC and WT may communicate in a normal fashion. If the E_Burst slot for the WT has not been assigned in the current CDF (step 1234*a*), then the WT waits until an $E_{13}$Burst slot is assigned (step 1235*a*). Meanwhile the WT keeps attempting to decode the CC_sig slot (step 1230*a*)and maintains its synchronization via the TFNSIG slot. If the E_Burst slot was assigned, the WT sends the $E_{13}$Burst in its E_Burst slot (step 1236*a*). Thereafter, The CC allocates the slot for the WT (step 1237*a*). Meanwhile, it is readily recalled that since the WT cannot decode the CC_sig, the WT cannot transmit in the slot assigned by the CC and the CC may also determines that the link between the WT and the CC is down (step 1204*a*).

The TFN is also processing the aforementioned data information (step 1222*a*)and forwarding it to the receiving WT (step 1223*a*). If the receiving WT is already adequately receiving the information from the transmitting WT, the TFN's information will be duplicative and discarded (steps 1224, 1225*a*). The process, it will be understood, would then proceed to step 1200*a*. If the data information being transmitted from the TFN is not duplicative, it is assumed that the link between WTs is down (1240*a*)and the TFN or the WT will inform the CC that the link is down (step 1242*a*).

Once the CC has determined that the link between the CC and the WT is down and that the TFN has an established link with the WT (step 1214*a*), the CC selects the TFN to initiate an "handoff" procedure. All data that would have been sent directly between the WT's is now directed to the TFN. Specifically, the CC moves the WT bandwidth allocation to the TFN and also allocates extra bandwidth to the TFN (step 1244*a*)to communicate with the CC and WT (step 1220*a*).

Figure 13A:
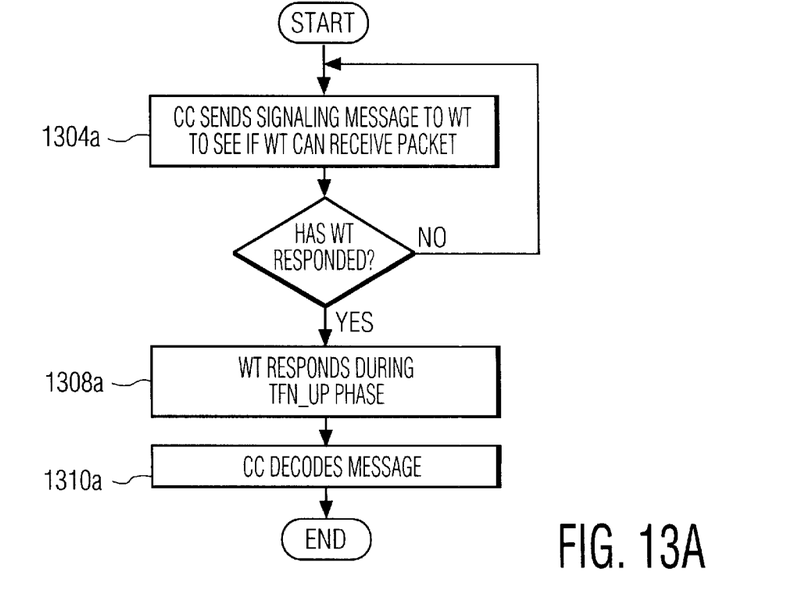
FIG. 13A is another flow chart illustrating a preferred embodiment of a method of communication in accordance with the present invention in an adhoc network.

To determine when the link between the CC and the WT is operational once again, the methodology of FIG. 13A is followed. Firstly, the CC sends a signaling message to the WT asking whether the WT can receive the CC signaling information packets (step 1304*a*)and continues to do so until the WT can respond (step 1306*a*). Upon the ability by the WT that it can receive the CC signaling information packet, WT responds with a "yes" via its signaling path during the TFN_UP phase (step 1308*a*). CC decodes this message (1310*a*), and then reestablishes communication.

Thus it can be seen that it is possible to have a TFN in a adhoc oriented network.

Accordingly, by providing a method that includes a temporary forwarding node as disclosed herein, it can be seen that an improved method to more reliably relay data and/or signaling information is provided. Additionally, it can be seen that the present invention can utilize either another base station or wireless terminal as the temporary forwarding node. The present invention therefore also improves reliable communication with the automatic detection of a faulty communication link with a wireless terminal. It can also be seen that the present invention can be utilized in a stationary environment such as in a residential or office building environment. Lastly, provided is a method to terminate the link with the temporary forwarding node when the link with the primary node is satisfactorily operational. All of these advantages can be realized in a base-station and adhoc configured networks.

It will thus be seen that the objects set forth above among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

What we claim is:

1. A method of transmitting information between a primary node and a wireless terminal in a communications system having at least the primary node, a secondary node and the wireless terminal, the method comprising:

establishing a communications link between the primary node and the secondary node;

determining that a communications link between the primary node and the wireless terminal is unsatisfactory for reliable information transmission;

transmitting information from the primary node to the secondary node for retransmission to the wireless terminal;

transmitting information from the wireless terminal to the secondary node for retransmission to the primary node during which the primary node is attempting to establish a communications link with the wireless terminal;

achieving establishment of the communications link between the primary node and the wireless terminal; and disabling the communications link between the second node and the wireless terminal;

wherein the wireless terminal determines that the communications link between the wireless terminal and the primary node is unsatisfactory for reliable information transmission, the determination includes transmitting a signal to the wireless terminal from the primary node and having the wireless terminal unable to accurately receive or decode the signal; and wherein the wireless terminal carry out the steps of decoding a secondary signal from the secondary node, the secondary signal having timing information needed by the wireless terminal to transmit information to the primary node, while repeatedly attempting to reestablish a satisfactory reliable communications link with the primary node and maintaining synchronization with the secondary node.

2. The method as claimed in claim 1, wherein it is the primary node that determines that the communications link between the primary node and the wireless terminal is unsatisfactory for reliable information transmission, and wherein the determining is carried out by the steps of:

transmitting information from the wireless terminal to the primary node; and determining that the primary node cannot decode the transmitted information.

3. The method as claimed in claim 1, wherein both the primary node and secondary node are base stations coupled together by a wired link.

4. The method as claimed in claim 1, wherein at least one of the primary and secondary nodes is a wireless terminal, the primary node and the secondary node being wirelessly connected.

5. A communications system for transmitting information, the system having at least a first node, a second node and a third node, the system further comprising:

means for establishing a first communications link between the first node and the second node;

means for establishing or maintaining a second communication link between the first node and the third node and for determining that the second communication link cannot be established or maintained;

means for transmitting information from the first node to the second node and for retransmitting the information to the third node;

means for reestablishing the second communication link between the first node and the third node and upon such establishment discontinuing the transmission of subsequent information from the first node to the second node and directly transmitting the subsequent information to the third node from the first node;

wherein the third node determines that the communications link between the third node and the first node is unsatisfactory for reliable information transmission, the determination includes transmitting a signal to the third node from the first node and having the third node unable to accurately receive or decode the signal; and wherein the third node carry out the steps of decoding a secondary signal from the second node, the second signal having timing information needed by the wireless terminal to transmit information to the first node, while repeatedly attempting to reestablish a satisfactory reliable communications link with the first node and maintaining synchronization with the second node.

6. The system as claimed in claim 5, wherein the first node is a base station, the second node is a second base station, and the third node is a wireless terminal.

7. The system as claimed in claim 6, wherein identical information is transmitted to the first base station from the second base station and the wireless terminal, and the first base station comprises means for determining whether the information is duplicative and for discarding said duplicative information.

8. The system as claimed in claim 5, wherein the first node is a central controller and the second and third nodes are wireless terminals.

9. The system as claimed in claim 8, including means for transmitting data information between the wireless terminals and means for transmitting control information between the central controller and one of the wireless terminals.

* * * * *